(12) United States Patent
Peng et al.

(10) Patent No.: US 11,280,172 B2
(45) Date of Patent: Mar. 22, 2022

(54) METHOD FOR EVALUATING AND PREVENTING CREEP DAMAGE TO CONDUCTIVITY OF HYDRAULIC FRACTURE IN GAS RESERVOIRS

(71) Applicant: SOUTHWEST PETROLEUM UNIVERSITY, Chengdu (CN)

(72) Inventors: Yu Peng, Chengdu (CN); Ang Luo, Chengdu (CN); Yongming Li, Chengdu (CN); Qing Yin, Chengdu (CN); Hu Jia, Chengdu (CN); Xiyu Chen, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 17/513,923

(22) Filed: Oct. 29, 2021

(65) Prior Publication Data

US 2022/0049591 A1 Feb. 17, 2022

(30) Foreign Application Priority Data

Jan. 28, 2021 (CN) .......................... 202110118903.X

(51) Int. Cl.
*E21B 49/00* (2006.01)
*E21B 43/26* (2006.01)
*E21B 43/267* (2006.01)
*E21B 49/08* (2006.01)
*G01N 3/08* (2006.01)

(52) U.S. Cl.
CPC .......... *E21B 43/267* (2013.01); *E21B 49/006* (2013.01); *E21B 49/087* (2013.01); *G01N 3/08* (2013.01); *E21B 2200/20* (2020.05); *G01N 2203/0071* (2013.01); *G01N 2203/0075* (2013.01); *G01N 2203/0218* (2013.01)

(58) Field of Classification Search
CPC .......... E21B 43/26; E21B 47/00; E21B 49/00; E21B 41/0092; E21B 43/267
See application file for complete search history.

(56) References Cited

U.S. PATENT DOCUMENTS

| 5,360,066 A | * | 11/1994 | Venditto | ............... E21B 43/119 166/250.1 |
| 9,305,121 B2 | * | 4/2016 | Yao | ........................ G06F 30/20 |

(Continued)

*Primary Examiner* — Kenneth L Thompson

(57) ABSTRACT

The present invention discloses a method for evaluating and preventing creep damage to conductivity of hydraulic fracture in gas reservoirs, comprising: (1) selecting a rock sample of target reservoir for creep experiment, and plotting ε-t curve of the rock sample during creep; (2) fitting the fractional Kelvin model with the ε-t curve of the rock sample during creep; (3) calculating the conductivity and permeability of hydraulic fracture considering creep damage; (4) numerically solving the productivity model, calculating the cumulative gas production of the gas well produced up to time t, and calculating the creep damage rate for cumulative production of the gas well; (5) repeating Steps (3) to (4), calculating the creep damage rate for cumulative production for the cases of hydraulic fracture sanding concentration N of 5 kg/m², 7.5 kg/m², 10 kg/m², 12.5 kg/m² and 15 kg/m² respectively, plotting the creep damage chart of cumulative production.

2 Claims, 4 Drawing Sheets

(56) References Cited

U.S. PATENT DOCUMENTS

| | | | |
|---|---|---|---|
| 9,784,876 B2* | 10/2017 | Quirein | G01V 1/50 |
| 10,571,605 B2* | 2/2020 | Crawford | G01V 99/005 |
| 10,724,346 B2* | 7/2020 | Eftekhari Far | G01V 99/005 |
| 11,098,582 B1* | 8/2021 | Camargo | E21B 41/00 |
| 2012/0156787 A1* | 6/2012 | Abass | E21B 43/26 |
| | | | 436/2 |
| 2018/0016895 A1* | 1/2018 | Weng | G01V 1/306 |
| 2018/0196905 A1* | 7/2018 | Wu | E21B 47/06 |
| 2019/0368350 A1* | 12/2019 | Liu | E21B 49/02 |
| 2021/0079788 A1* | 3/2021 | Wang | E21B 47/06 |

\* cited by examiner

METHOD FOR EVALUATING AND PREVENTING CREEP DAMAGE TO CONDUCTIVITY OF HYDRAULIC FRACTURE IN GAS RESERVOIRS

TECHNICAL FIELD

The present invention belongs to the field of oil and gas field development, in particular to a method for evaluating and preventing creep damage to conductivity of hydraulic fracture in gas reservoirs.

DESCRIPTION OF PRIOR ART

Hydraulic fracturing technology has become an irreplaceable development tool in the development of gas reservoirs. After fracturing is completed, hydraulic fractures with high conductivity are formed in the reservoir, and provide efficient flow channels for natural gas seepage. However, it has been found after long-term practice and study that the conductivity of hydraulic fracture will attenuate to varying degrees with the passage of production time, resulting in a gradual decrease in the productivity of fractured wells. In order to reduce the conductivity damage and increase gas well productivity, it is important to study the law and evaluation method of conductivity damage.

At present, the method of evaluating the conductivity damage of hydraulic fracture mainly considers the impact of proppant crushing, embedment and deformation. WEN Qingzhi et al. proposed a conductivity damage model considering proppant embedment based on experimental analysis, and provided a calculation method for conductivity attenuation with time (WEN Qingzhi, ZHANG Shicheng, WANG Lei, and LIU Yongshan. Influence of proppant embedment on fracture long-term conductivity [J]. Natural Gas Industry, 2005, (5):65-68). SHANG Shilong proposed a calculation method for the upward attenuation of the conductivity along the fracture length considering the pollution effect and non-Darcy effect of the fracture wall reservoir during fracturing (SHANG Shilong, MA Xinfang, HOU Tengfei, GAO Jiayin, and SHAO Junjie. Study on non-darcy productivity of fractured gas well with varying conductivity [J]. Science Technology and Engineering, 2016, 16 (16): 173-178, 198). LI Yongming et al. proposed a fracture width prediction model considering proppant deformation and embedment, thus further obtained a conductivity prediction model considering proppant deformation and embedment (LI Yongming, CHENG Leming, ZHOU Wenwu. A new prediction model of propped fracture width considering proppant deformation [J]. Science Technology and Engineering, 2018, 18(6):107 113). Based on previous studies, SUN Hedong proposed a conductivity damage model that comprehensively considered the spatial and temporal conductivity and stress sensitivity effect of fractures, and established a productivity model for tight gas fractured wells based on this model (SUN Hedong, OUYANG Weiping. Advanced production decline analysis of tight gas wells with variable fracture conductivity [J]. Petroleum Exploration and Development, 2018, (3):472-480).

For reservoirs with high shaliness, the damage of fracture conductivity is not only affected by proppant crushing, deformation and embedment. The conductivity of hydraulic fracture will also be weakened by rock creep significantly. However, the adverse influence of rock creep on the conductivity of fractures was not considered in the above evaluation methods. As a result, the evaluation of fracture conductivity in gas reservoir development is not comprehensive enough to effectively prevent the conductivity attenuation caused by rock creep, thus affecting the productivity of gas wells. Therefore, a method for evaluating and preventing creep damage to the conductivity of hydraulic fracture in gas reservoir is needed to improve the evaluation system of fracture conductivity damage, so as to identify the creep damage sensitivity of target reservoir and put forward appropriate prevention methods.

SUMMARY OF THE INVENTION

The purpose of the present invention is to provide a method for evaluating and preventing creep damage to the conductivity of hydraulic fracture in gas reservoirs, which is used to evaluate the creep damage sensitivity of hydraulic fracture conductivity, put forward corresponding prevention recommendations, maintain fracture conductivity in a targeted manner, effectively improve the productivity, and overcome the defects and shortcomings of the prior art, with broad market application prospects.

To achieve the above technical objectives, the following technical solutions are used in the present invention.

Firstly, the creep physical parameters of the rock sample are obtained by fitting the experimental rock creep data, which are the foundation and basis of creep damage evaluation. Then, the conductivity of hydraulic fracture considering creep damage is obtained according to the creep physical parameters. On this basis, the cumulative productivity and the creep damage rates of cumulative productivity that considers or does not consider creep damage are further obtained, so as to judge the creep damage of the gas well reservoir. Finally, a creep damage chart of gas well cumulative productivity is drawn, and a creep damage prevention method under different conditions is provided according to the chart.

A method for evaluating and preventing creep damage to the conductivity of hydraulic fracture in gas reservoirs, comprising the following steps:

(1) Selecting a rock sample of a target reservoir for creep experiment, and plotting a strain $\varepsilon$ versus time t curve of the rock sample during the creep experiment.

A triaxial rock mechanics stress-strain test system should be employed in the experiment. Standard core without fractures (preferably without stratification) should be taken as samples, with a diameter of 2.5 cm, a length of at least 4 cm, and a non-parallelism of less than 0.015 mm at both ends.

The process is described as follows: drilling out standard rock samples from the target reservoir; cleaning the rock samples; saturating the fluid; warming up the triaxial rock mechanics stress-strain test system to reservoir temperature; loading the core uniformly and slowly to the pre-set effective loading stress value, and keeping the loading stress and temperature stable for at least 4 h; recording the strain variation of rock samples with time in the stable loading process, and plotting the strain $\varepsilon$ versus time t curve (i.e., $\varepsilon$-t curve) of the rock sample during the creep experiment.

(2) Fitting the fractional Kelvin model with the strain $\varepsilon$ versus time t curve of the rock sample during the creep experiment, and the fitting equation of fractional Kelvin model is as follows (Zhou, H. W., Wang, C. P., Han, B. B., et al. A creep constitutive model for salt rock based on fractional derivatives [J]. International Journal of Rock Mechanics and Mining Sciences, 2011, 48(1):116-121):

$$\varepsilon = \frac{\sigma_z}{E_v}\left[1 - E_\alpha\left(-\frac{t^\alpha}{\tau}\right)\right]; \tag{1}$$

$$E_\alpha\left(-\frac{t^\alpha}{\tau}\right) = \sum_{n=0}^{\infty} \frac{\left(-\frac{t^\alpha}{\tau}\right)^n}{\Gamma(\alpha n + 1)}; \tag{2}$$

$$\Gamma(\alpha n + 1) = \int_0^\infty T^{\alpha n+1-1} e^{-T} dT. \tag{3}$$

Where, $\varepsilon$—Strain in rock samples during the creep experiment, dimensionless;
$E_v$—Viscous modulus of rock sample, in MPa;
$\alpha$—Derivative order, dimensionless;
t—Time, in s;
$\tau$—Fractional relaxation time, in $s^\alpha$;
$\sigma_z$—Axial differential pressure of rock sample, in MPa;
n—Set of natural numbers, 0, 1, 2, 3 . . . ;
T—Integral variable, taken as [0, $\infty$].

Fitting the $\varepsilon$-t curve with the above equations to obtain the viscous modulus $E_v$ of the rock sample and the fractional relaxation time r and derivative order $\alpha$ of the fractional Kelvin model.

(3) Calculating the conductivity and permeability of hydraulic fracture considering creep damage.

Firstly, substituting the sanding concentration N and bulk density $\rho$ of the proppant into the following equation to calculate the hydraulic fracture width D:

$$D = 1000 \times \frac{N}{\rho}. \tag{4}$$

Where, D—Hydraulic fracture width, in mm;
N—Sanding concentration of proppant, in kg/m²;
$\rho$—Bulk density of proppant, in kg/m³.

Substituting the hydraulic fracture width D, the viscous modulus $E_v$ of the rock sample, the fractional relaxation time r, and the derivative order $\alpha$ into the Equation (5) to obtain the conductivity of hydraulic fracture considering creep damage (Li K W, Gao Y P, Lyu Y C, Wang M. New Mathematical Models for Calculating Proppant Embedment and Fracture Conductivity [J]. SPE Journal, 2015, 20(3): 496-507):

$$\begin{cases} F_{RCD} = \frac{74.8 f_1 (f_1 - 0.74)(Df_1 - df_2)}{0.5 f_1^2 + 1} d^2 \\ f_1 = 1 - 2.08\left(\hat{p}\frac{1-v_1^2}{E_1}\right)^{\frac{2}{3}} \\ f_2 = 2.08\left(\hat{p}\frac{1-v_1^2}{E_1} + \hat{p}\frac{1-v_2^2}{\hat{E}_2}\right)^{\frac{2}{3}} - 2.08\left(\hat{p}\frac{1-v_1^2}{E_1}\right)^{\frac{2}{3}} \\ \frac{1}{\hat{E}_2} = \frac{1}{E_2} + \frac{1}{E_v}\frac{1}{1 + \tau s^\alpha} \end{cases} \tag{5}$$

$$\hat{p} = \int_0^\infty p \cdot e^{-st} dt \tag{6}$$

Where, $F_{RCD}$—The conductivity of hydraulic fracture considering creep damage, in D·cm;
d—Proppant diameter, in mm;
$v_1$—Poisson's ratio of proppant;
$E_1$—Elastic modulus of proppant, in MPa;
$v_2$—Poisson's ratio of reservoir rock sample;
$\hat{E}_2$—Elastic modulus of reservoir rock samples in Laplace space, in MPa;
$E_2$—Elastic modulus of reservoir rock sample, in MPa;
$\hat{p}$—Pressure at any position in hydraulic fracture in Laplace space, in MPa;
p—Pressure at any position in hydraulic fracture, in MPa;
s—Laplace variable, in $s^{-1}$.

Since the fracture conductivity is the product of the fracture width and the fracture permeability, the hydraulic fracture permeability $K_{FR}$ considering creep damage can be obtained by the following equation on the basis of the conductivity calculation model:

$$K_{FR} = F_{RCD}/D \tag{7}.$$

(4) Calculating the creep damage rate for cumulative production of the gas well with the following procedure:

A gas well productivity model is established, and a matrix grid is built in the x-y rectangular coordinate system, with reservoir length and width are denoted as $L_x$ and $L_y$, respectively; $L_x$ is divided into $n_i$ sections in x direction and $L_y$ into $n_j$ sections in y direction, so the reservoir is divided into an $n_i \times n_j$ matrix grid, with (i,j) representing the number of each grid cell and $x_{i,j}$ and $y_{i,j}$ representing the length and width of each grid cell respectively. Hydraulic fractures are established with embedded discrete fracture model, and divided by the matrix grid into $n_l$ hydraulic fracture segments; the length of the hydraulic fracture segment in the first section is $\xi_l$; moreover, a local coordinate system of the fracture is established, which defines $\xi$ as the fracture direction in the local coordinate system. In hydraulic fractures, the capillary force is ignored, and the water pressure and the gas pressure are the same as PF. The productivity model is as follows (Lee S H, Lough M F, Jensen C L. Hierarchical modeling of flow in naturally fractured formations with multiple length scales [J]. Water Resources Research, 2001, 37(3):443-455. Chen Xi. Flowback Simulation of Fractured Horizontal Wells in Shale Gas Reservoirs [D]. Southwest Petroleum University, 2019):

a) The differential equations of two-phase seepage of fracture and matrix are:

$$\frac{\partial}{\partial \xi}\left(\beta \frac{K_F K_{Frw}}{\mu_w B_w} \frac{\partial P_F}{\partial \xi}\right) + \frac{q_{Fw}}{V_F} + \frac{\beta K_m K_{mrw}}{\mu_w B_w}(P_{mw} - P_F) = \frac{\partial}{\partial t}\left(\frac{\phi_F S_{Fw}}{B_w}\right); \tag{8}$$

$$\frac{\partial}{\partial \xi}\left(\beta \frac{K_F K_{Frg}}{\mu_g B_g} \frac{\partial P_F}{\partial \xi}\right) + \frac{q_{Fg}}{V_F} + \frac{\beta K_m K_{mrg}}{\mu_g B_g}(P_{mg} - P_F) = \frac{\partial}{\partial t}\left(\frac{\phi_F S_{Fg}}{B_g}\right); \tag{9}$$

$$\nabla\left(\beta \frac{K_m K_{mrw}}{\mu_w B_w} \nabla P_{mw}\right) - \frac{\beta K_m K_{mrw}}{\mu_w B_w}(P_{mw} - P_F)\delta_m = \frac{\partial}{\partial t}\left(\frac{\phi_m S_{mw}}{B_w}\right); \tag{10}$$

$$\nabla\left(\beta \frac{K_m K_{mrg}}{\mu_g B_g} \nabla P_{mg}\right) - \frac{\beta K_m K_{mrg}}{\mu_g B_g}(P_{mg} - P_F)\delta_m = \frac{\partial}{\partial t}\left(\frac{\phi_m S_{mg}}{B_g}\right); \tag{11}$$

$$S_{mg} = 1 - S_{mw}; \tag{12}$$

$$S_{Fg} = 1 - S_{Fw}; \tag{13}$$

$$P_{mc} = P_{mg} - P_{mw}. \tag{14}$$

Where, $K_{Frw}$ and $K_{Frg}$—Relative permeability of water and gas in hydraulic fracture, dimensionless;
$K_F$—Hydraulic fracture permeability, D; if considering creep damage, $K_F = K_{FR}$; if not considering creep damage, $K_F = K_{F0}$;
$V_F$—Volume of hydraulic fracture, in m³;
$q_{Fw}$, $q_{Fg}$—Source sink terms of water and gas in hydraulic fracture, in m³/s;

$S_{Fw}$, $S_{Fg}$—Water saturation and gas saturation in hydraulic fracture, dimensionless;

$\varphi_F$, $\varphi_m$—Porosity of hydraulic fracture and matrix, dimensionless;

$P_F$—Water and gas pressure of hydraulic fracture, in MPa;

$\mu_w$ and $\mu_g$—Viscosity of water and Viscosity of gas, in mPa·s;

$B_w$ and $B_g$—Volume coefficient of water and Volume coefficient of gas, in m³/m³;

$K_m$—Permeability of matrix, D;

$P_{mw}$ and $P_{mg}$—Pressure of water and Pressure of gas in matrix, in MPa;

$P_{mc}$—Capillary pressure in matrix, in MPa;

$K_{mrw}$, and $K_{mrg}$—Relative permeability of water and Relative permeability of gas in matrix, dimensionless;

$S_{mw}$ and $S_{mg}$—Water saturation and gas saturation in matrix, dimensionless;

β—Unit conversion factor, taken as β=0.001;

t—Time, in s;

ξ—Fracture direction in local coordinate system of the fracture;

$\delta_m$—Equation parameter; the matrix grid with fractures through it will undergo matrix-fracture fluid exchange. If the fracture passes through matrix grid, $\delta_m$=1; if the fracture does not passes through matrix grid, $\delta_m$=0.

b) The initial conditions include the distribution of initial pressure and initial saturation, namely:

$$\begin{cases} P_F(x, y, t)|_{t=0} = P_{F0}(x, y) \\ P_{mg}(x, y, t)|_{t=0} = P_{mg0}(x, y) \end{cases} \quad (15)$$

Where, $P_{F0}(x,y)$—Distribution of initial gas pressure in hydraulic fracture, in MPa;

$P_{mg0}(x,y)$—Distribution of initial gas pressure in matrix, in MPa;

x, y—Horizontal and vertical coordinates respectively in rectangular coordinate system.

$$\begin{cases} S_{Fw}(x, y, t)|_{t=0} = S_{Fw0}(x, y) \\ S_{mw}(x, y, t)|_{t=0} = S_{mw0}(x, y) \end{cases} \quad (16)$$

Where, $S_{Fw0}(x,y)$—Distribution of initial water saturation in hydraulic fracture, dimensionless;

$S_{mw0}(x,y)$—Distribution of initial water saturation in matrix, dimensionless.

c) The inner boundary conditions are:

$$\begin{cases} P_F(x_w, y_w, t) = P_{wf}(t) \\ P_m(x_w, y_w, t) = P_{wf}(t) \end{cases} \quad (17)$$

Where, $x_w$ and $y_w$—Horizontal and vertical coordinates of the grid cell where the gas well is located, in m;

$P_{wf}$—Bottom hole pressure, in MPa.

d) The outer boundary conditions are:

$$\begin{cases} \frac{\partial P_m}{\partial x}\bigg|_{x=0,L_x} = 0 \\ \frac{\partial P_m}{\partial y}\bigg|_{y=0,L_y} = 0 \end{cases} \quad (18)$$

Where, $L_x$, $L_y$—Reservoir length and Reservoir width, respectively, in m;

The above productivity model is numerically solved to obtain the gas saturation $S_{Fg}$ in the hydraulic fracture and the gas saturation $S_{mg}$ in the matrix at different times, thereby obtaining the gas saturation $S_{mgi,j,t}$ of each matrix grid cell and the gas saturation $S_{Fgl,t}$ of each hydraulic fracture segment in the reservoir at time t, so as to calculate the cumulative gas production Q of the gas well produced up to time t:

$$Q = \sum_{i=1}^{n_i} \sum_{j=1}^{n_j} (x_{i,j} \cdot y_{i,j} \cdot h)\phi_m(S_{mg\,i,j,0} - S_{mg\,i,j,t}) + \sum_{l=1}^{n_l} (\xi_l \cdot D \cdot h_F)\phi_F(S_{Fg\,l,0} - S_{Fg\,l,t}). \quad (19)$$

Where, Q—Cumulative gas production of gas wells from production to time t, in m³.

i, j—Grid coordinates of the matrix;

$n_i$, $n_j$—Total number of grids in x and y directions in matrix grid;

$n_l$—Number of hydraulic fracture segments;

$S_{mgi,j,0}$—Initial gas saturation in the grid at positions i and j;

$S_{mgi,j,t}$—Gas saturation in the grid at time t at positions i and j;

$x_{i,j}$, $y_{i,j}$—Length and width of the grid at positions i and j, in m;

$S_{Fgl,0}$—Initial gas saturation of the l-th hydraulic fracturing segment;

$S_{Fgl,t}$—Gas saturation of the l-th hydraulic fracturing segment at time t;

$\xi_l$—Length of the l-th hydraulic fracture segment, in m;

$h_F$—Height of hydraulic fracture, in m;

h—Reservoir thickness, in m.

If $K_F=K_{FR}$, the cumulative gas production $Q_1$ considering creep damage is obtained by the above equation.

If $K_F=K_{F0}$, the cumulative gas production $Q_2$ without considering creep damage is obtained by the above equation.

The creep damage rate C of the cumulative production is calculated by the following equation:

$$C = \frac{|Q_1 - Q_2|}{Q_2} \times 100\%. \quad (20)$$

Where, C—Creep damage rate for cumulative production;

$Q_1$—Cumulative gas production considering creep damage, in m³;

$Q_2$—Cumulative gas production without considering creep damage, in m³.

When C≤5%, the effect of creep is minimal and the reservoir is not susceptible to creep damage; when 5%<C≤10%, the reservoir is sensitive to creep damage, and creep damage can be effectively avoided by adjusting the fracturing technological parameters; when C>10%, the reservoir is more sensitive to creep damage.

(5) Plotting the creep damage chart of cumulative production and identify the creep damage prevention method.

Repeat Steps (3) to (4) and calculate the creep damage rate for cumulative production for the cases of hydraulic fracture sanding concentration N of 5 kg/m², 7.5 kg/m², 10 kg/m², 12.5 kg/m² and 15 kg/m² respectively. Plotting the creep damage chart of cumulative production according to the calculated results. In the chart, the different lines represent gas wells with different viscous moduli $E_v$, the abscissa represents the sanding concentration, and the ordinate represents the creep damage rate for cumulative production.

If the sanding concentration is 5 kg/m² and C≤5%, it is unnecessary to consider the damage caused by reservoir rock creep to the conductivity of hydraulic fracture in the well and the on-site fracturing may be performed according to the recommended parameters in development plan.

If the sanding concentration N is 5 kg/m², 5%<C≤10%, or if N is 5 kg/m², C>10% and then ≤10% after N is increased, creep damage can be effectively avoided by adjusting the proppant particle size, proppant sanding concentration and flowback regime in the well; in construction, the proppant with smaller mesh size should be selected and sanding concentration increased, and it is also necessary to minimize the contact time between the fracturing fluid and the matrix rock, and slowly increase the flowback speed by forced flowback or flowback method with multiple working systems.

If the creep damage rate C of cumulative production is still higher than 10% after the sanding concentration N reaches 15 kg/m², the effect of creep damage can only be reduced by increasing the sanding concentration in the well. Therefore, the sanding concentration of hydraulic fracture shall be enhanced as much as possible in fracturing operation.

DETAILED DESCRIPTION OF THE PREFERRED EMBODIMENTS

The present invention is further explained according to the drawings and embodiments for those skilled in the art to understand the present invention. It should be understood, however, that the present invention is not limited to the scope of the preferred embodiments. For persons of ordinary skill in the art, these changes are obvious without departing from the spirit and scope of the present invention defined and determined by the appended claims.

Embodiment 1

Three gas wells (Z1, Z2 and Z3) in a block in northeast Shaanxi were studied as examples to evaluate the creep damage to fracture conductivity of each well with the method proposed in the present innovation and provide associated prevention methods. The following calculations were performed for Wells Z1, Z2 and Z3, respectively.

Step 1: Selecting rock samples of a target reservoir from three wells to perform rock creep experiments, and plot strain-time curves in the creep process of the three wells.

Figure 1:
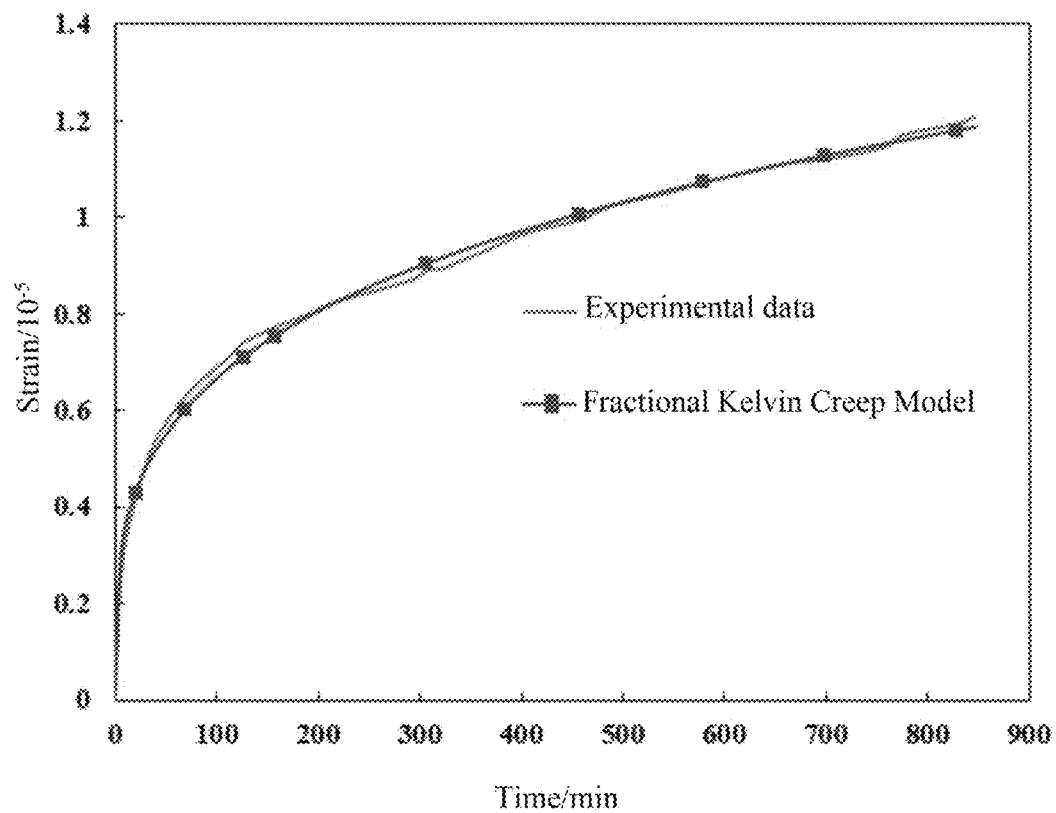
FIG. 1 shows the core creep test results and fitting results of Well Z1.
Figure 2:
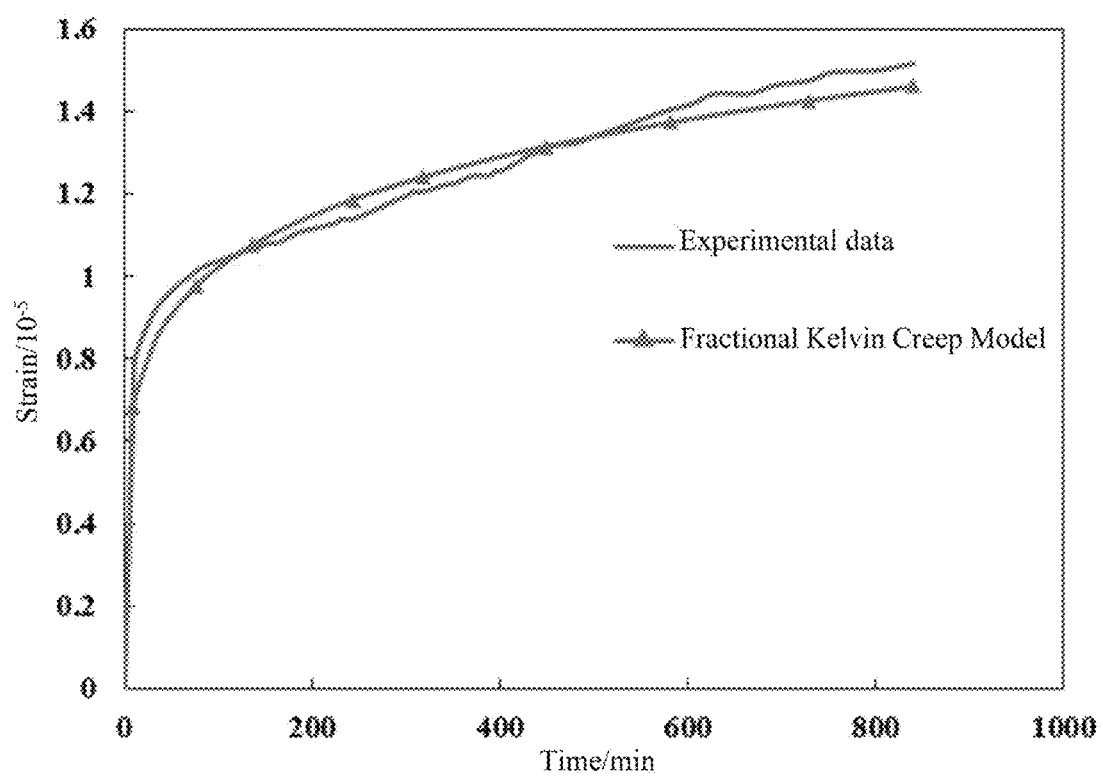
FIG. 2 shows the core creep test results and fitting results of Well Z2.
Figure 3:
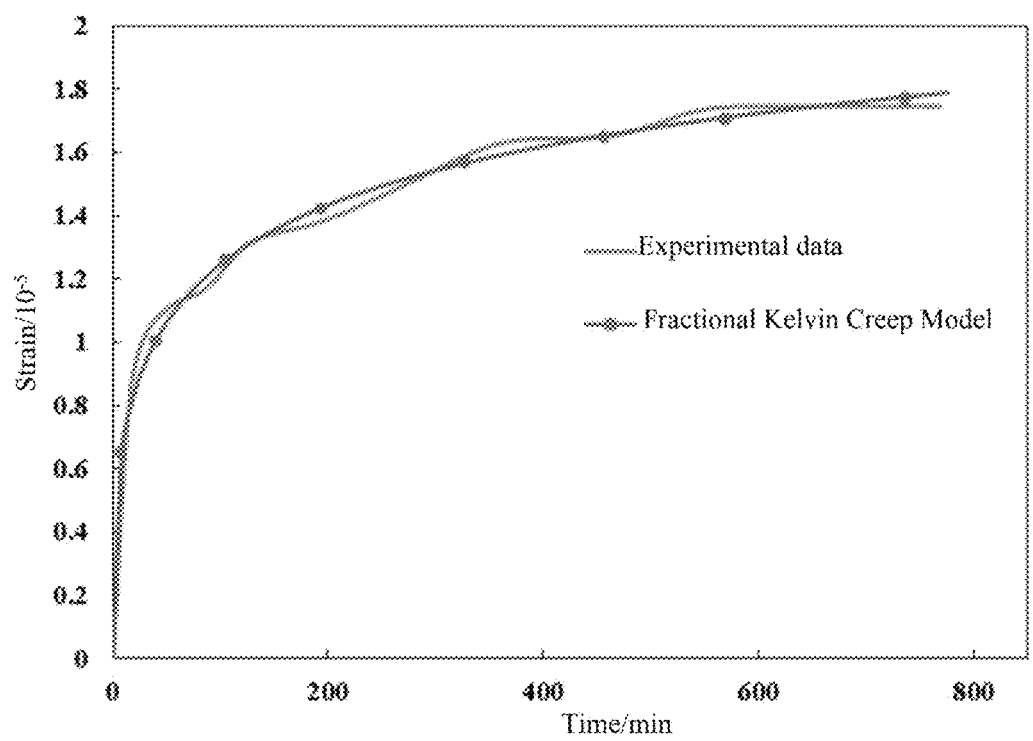
FIG. 3 shows the core creep test results and fitting results of Well Z3.

Step 2: Fitting the three strain-time curves with the Equations (1) to (3) respectively, obtaining the viscous modulus $E_{2v}$ as 6,877.57 MPa, 2,294.63 MPa and 3,6751.20 MPa of the experimental rock samples of Wells Z1, Z2 and Z3, as well as the fractional relaxation time τ as 87.22 $s^\alpha$, 100 $s^\alpha$ and 6.298 $s^\alpha$ and derivative order α as 0.2868, 0.1729 and 0.3766 in the fractional Kelvin model, respectively. The creep experimental data and fitting results for the three wells are plotted as shown in FIGS. 1, 2 and 3.

Step 3: Substituting the sanding concentration N and bulk density ρ of the proppant for the hydraulic fractures in Wells Z1, Z2 and Z3 after fracturing into the Equation (4) and obtain the widths of hydraulic fractures in the three wells. Next, substituting the obtained parameters into the Equations (5) to (7) and obtain the hydraulic fracture permeability $K_{FR}$ considering creep damage for the three wells.

Step 4: Substituting the hydraulic fracture permeability $K_{FR}$ of the three wells and the reservoir parameters obtained in Step 1 into the Equations (8) to (19) for the three wells, and calculating the cumulative gas production $Q_2$ of Wells Z1, Z2, and Z3 after 30 days of production considering creep damage. Then, substituting the initial hydraulic fracture permeability $K_{F0}$ of the three wells and the reservoir parameters obtained in Step 1 into the Equations (8) to (19), and calculating the cumulative gas production $Q_1$ of Wells Z1, Z2, and Z3 after 30 days of production without considering creep damage. Next, substituting $Q_1$ and $Q_2$ in to the Equation (20) and obtaining the creep damage rate C of cumulative production to determine the creep damage to fracture conductivity of the target reservoir in each well. The creep damage rates C of cumulative production of Wells Z1, Z2 and Z3 were 0.0716, 0.2805 and 0.0155, respectively.

Therefore, the target reservoir of Well Z1 was sensitive to creep damage which could be effectively avoided by adjusting the fracturing technological parameters. The target reservoir of well Z2 was more sensitive to creep damage and not prone to creep damage.

Figure 4:
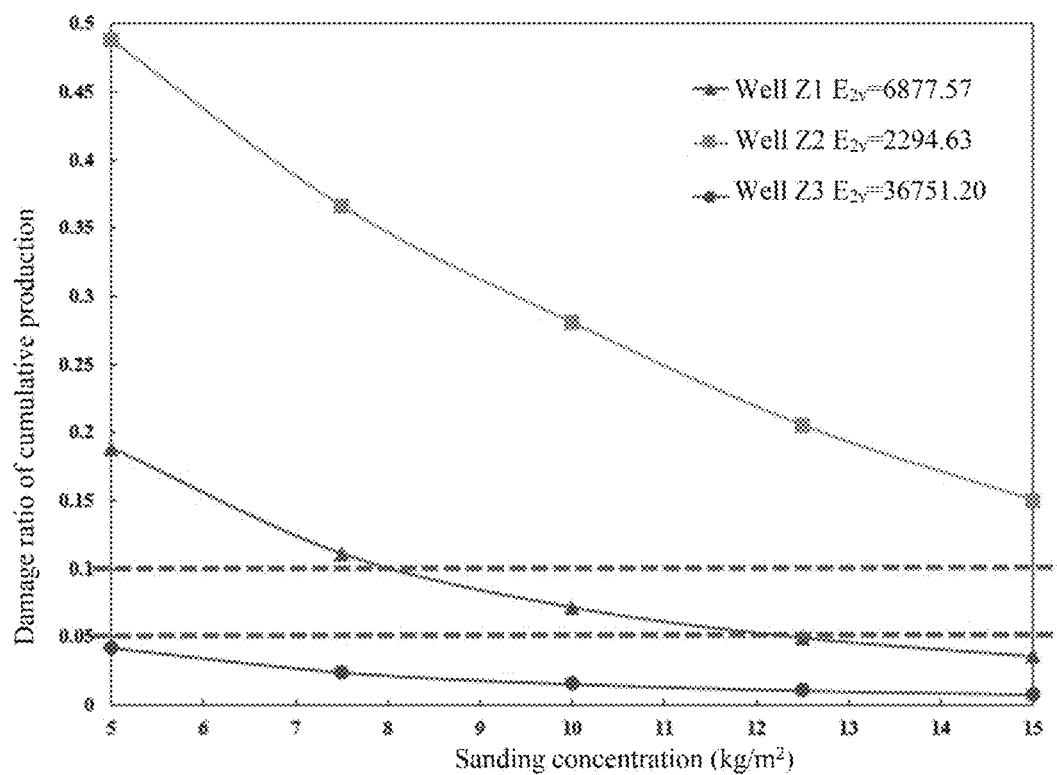
FIG. 4 is a chart on creep damage to cumulative production of Wells Z1, Z2 and Z3.

Step 5: Repeating Steps 3 to 4 for the cases of sanding concentration N of 5 kg/m², 7.5 kg/m², 10 kg/m², 12.5 kg/m² and 15 kg/m², and obtaining the creep damage rate C of the cumulative production at different sanding concentrations. Then, plotting the results obtained from the calculations for Wells Z1, Z2 and Z3 onto the creep damage chart of the same cumulative production (FIG. 4).

According to the creep damage chart, the creep damage rate for cumulative production of Well Z2 was still higher than 10% after the sanding concentration reached 15 kg/m². Therefore, the effect of creep damage can only be reduced by increasing the sanding concentration in the well, and the sanding concentration should be increased as much as possible in fracturing operation. Combined with the actual construction conditions, the optimal range of sanding concentration for hydraulic fracturing is 10 kg/m² to 12.5 kg/m².

In Well Z1, when the sanding concentration was 5 kg/m², C>10% and then <10% after the sanding concentration was increased, creep damage can be effectively avoided by adjusting the proppant particle size, proppant sanding concentration and flowback regime in the well. In construction, the proppant with smaller mesh size should be selected, and the sanding concentration should be controlled at 12 kg/m² in combination with the construction conditions. It is also necessary to minimize the contact time between the fracturing fluid and the matrix rock, and slowly increase the flowback speed by forced flowback or flowback method with multiple working systems.

In Well Z3, when the sanding concentration is 5 kg/m² and C<5%, it is unnecessary to consider the damage caused by reservoir rock creep to the conductivity of hydraulic fracture and the on-site fracturing may be continued according to the recommended parameters in development plan.

The invention claimed is:
1. A method for evaluating and preventing a creep damage to a conductivity of a hydraulic fracture in gas reservoirs, comprising the following steps:
(1) selecting a rock sample of a target reservoir for a creep experiment, and plotting a strain ε versus time t curve of the rock sample during the creep experiment;
(2) fitting a fractional Kelvin model with the strain ε versus time t curve of the rock sample during the creep experiment, and a fitting equation of the fractional Kelvin model is as follows:

$$\varepsilon = \frac{\sigma_z}{E_v}\left[1 - E_\alpha\left(-\frac{t^\alpha}{\tau}\right)\right]; \quad (1)$$

$$E_\alpha\left(-\frac{t^\alpha}{\tau}\right) = \sum_{n=0}^{\infty} \frac{\left(-\frac{t^\alpha}{\tau}\right)^n}{\Gamma(\alpha n + 1)}; \quad (2)$$

$$\Gamma(\alpha n + 1) = \int_0^\infty T^{\alpha n+1-1} e^{-T} dT; \quad (3)$$

where, ε—a strain in the rock sample during the creep experiment, dimensionless;
$E_v$—a viscous modulus of the rock sample, in MPa;
α—a derivative order, dimensionless;
t—a time, in s;
τ—a fractional relaxation time, in $s^\alpha$;
$\sigma_z$—an axial differential pressure of the rock sample, in MPa;
n—a set of natural numbers, 0, 1, 2, 3 . . . ;
T—an integral variable, taken as [0, ∞];
fitting them with the strain ε versus time t curve to obtain the viscous modulus $E_v$, the fractional relaxation time τ, and the derivative order α;
(3) substituting a hydraulic fracture width D, the viscous modulus $E_v$ of the rock sample, the fractional relaxation time τ, and the derivative order α into the following equations to obtain a hydraulic fracture conductivity $F_{RCD}$ and a hydraulic fracture permeability $K_{FR}$ considering the creep damage:

$$\begin{cases} F_{RCD} = \frac{74.8 f_1 (f_1 - 0.74)(Df_1 - df_2)}{0.5 f_1^2 + 1} d^2 & (5) \\ f_1 = 1 - 2.08\left(\hat{p}\frac{1-v_1^2}{E_1}\right)^{\frac{2}{3}} \\ f_2 = 2.08\left(\hat{p}\frac{1-v_1^2}{E_1} + \hat{p}\frac{1-v_2^2}{\hat{E}_2}\right)^{\frac{2}{3}} - 2.08\left(\hat{p}\frac{1-v_1^2}{E_1}\right)^{\frac{2}{3}} \\ \frac{1}{\hat{E}_2} = \frac{1}{E_2} + \frac{1}{E_v}\frac{1}{1+\tau s^\alpha} \end{cases}$$

$$\hat{p} = \int_0^\infty p \cdot e^{-st} dt; \quad (6)$$

$$K_{FR} = \frac{F_{RCD}}{D}; \quad (7)$$

where, d—a diameter of a proppant, in mm;
$v_1$—a Poisson's ratio of the proppant;
$E_1$—an elastic modulus of the proppant, in MPa;
$v_2$—a Poisson's ratio of the rock sample of the target reservoir;
$\hat{E}_2$—an elastic modulus of the rock sample of the target reservoir in Laplace space, in MPa;
$E_2$—an elastic modulus of the rock sample of the target reservoir, in MPa;
$\hat{p}$—a pressure at any position in the hydraulic fracture in Laplace space, in MPa;
p—a pressure at any position in the hydraulic fracture, in MPa;
s—a Laplace variable, in $s^{-1}$;
(4) calculating a creep damage rate for cumulative production of a gas well with the following steps:
a gas well productivity model is established, in a x-y rectangular coordinate system, a reservoir length and a reservoir width are denoted as $L_x$ and $L_y$, respectively; $L_x$ is divided into $n_i$ sections in the x direction and $L_y$ is divided into $n_j$ sections in the y direction, so the target reservoir is divided into an $n_i \times n_j$ matrix grid, with (i,j) representing a number of each grid cell, and $x_{i,j}$ and $y_{i,j}$ representing a length and a width of each grid cell respectively; the hydraulic fracture is divided by the matrix grid into $n_l$ hydraulic fracture segments; the length of the hydraulic fracture segment in a first section is $\xi_i$; moreover, a local coordinate system of the hydraulic fracture is established, which defines ξ as a fracture direction in the local coordinate system, then:
a) differential equations of two-phase seepage of the hydraulic fracture and the matrix are:

$$\frac{\partial}{\partial \xi}\left(\beta \frac{K_F K_{Frw}}{\mu_w B_w}\frac{\partial P_F}{\partial \xi}\right) + \frac{q_{Fw}}{V_F} + \frac{\beta K_m K_{mrw}}{\mu_w B_w}(P_{mw} - P_F) = \frac{\partial}{\partial t}\left(\frac{\phi_F S_{Fw}}{B_w}\right); \quad (8)$$

$$\frac{\partial}{\partial \xi}\left(\beta \frac{K_F K_{Frg}}{\mu_g B_g}\frac{\partial P_F}{\partial \xi}\right) + \frac{q_{Fg}}{V_F} + \frac{\beta K_m K_{mrg}}{\mu_g B_g}(P_{mg} - P_F) = \frac{\partial}{\partial t}\left(\frac{\phi_F S_{Fg}}{B_g}\right); \quad (9)$$

$$\nabla\left(\beta \frac{K_m K_{mrw}}{\mu_w B_w}\nabla P_{mw}\right) - \frac{\beta K_m K_{mrw}}{\mu_w B_w}(P_{mw} - P_F)\delta_m = \frac{\partial}{\partial t}\left(\frac{\phi_m S_{mw}}{B_w}\right); \quad (10)$$

$$\nabla\left(\beta \frac{K_m K_{mrg}}{\mu_g B_g}\nabla P_{mg}\right) - \frac{\beta K_m K_{mrg}}{\mu_g B_g}(P_{mg} - P_F)\delta_m = \frac{\partial}{\partial t}\left(\frac{\phi_m S_{mg}}{B_g}\right); \quad (11)$$

$$S_{mg} = 1 - S_{mw}; \quad (12)$$

$$S_{Fg} = 1 - S_{Fw}; \quad (13)$$

$$P_{mc} = P_{mg} - P_{mw}; \quad (14)$$

where, $K_{Frw}$ and $K_{Frg}$—a relative permeability of water and a relative permeability of gas in the hydraulic fracture, dimensionless;
$K_F$—a Hydraulic fracture permeability, D; if considering the creep damage, $K_F = K_{FR}$; if not considering the creep damage, $K_F = K_{F0}$, and $K_{F0}$ is an initial permeability of the hydraulic fracture;
$V_F$—a volume of the hydraulic fracture segment, in $m^3$;
$q_{Fw}$, $q_{Fg}$—a source sink terms of water and a source sink term of gas in the hydraulic fracture, in $m^3/s$;
$S_{Fw}$, $S_{Fg}$—a water saturation and a gas saturation in the hydraulic fracture, dimensionless;
$\varphi_F$, $\varphi_m$—a porosity of the hydraulic fracture and a porosity of the matrix, dimensionless;
$P_F$—a water pressure and a gas pressure of the hydraulic fracture, in MPa;
$\mu_w$ and $\mu_g$—a viscosity of water and a viscosity of gas, in mPa·s;
$B_w$ and $B_g$—a volume coefficient of water and a volume coefficient of gas, in $m^3/m^3$;
$K_m$—a permeability of matrix, D;
$P_{mw}$ and $P_{mg}$—a pressure of water and a pressure gas in matrix, in MPa;

$P_{mc}$—a capillary pressure in the matrix, in MPa;
$K_{mrw}$ and $K_{mrg}$—a relative permeability of water and a relative permeability of gas in the matrix, dimensionless;
$S_{mw}$ and $S_{mg}$—a water saturation and a gas saturation in the matrix, dimensionless;
β—an unit conversion factor, taken as β=0.001;
t—a time, in s;
ξ—a fracture direction in the local coordinate system of the hydraulic fracture;
$\delta_m$—an equation parameter, $\delta_m$=1 if there is the hydraulic fracture passing through the matrix grid, or $\delta_m$=0 if there is no hydraulic fracture passing through;

b) initial conditions include a distribution of the initial pressure and the initial saturation:

$$\begin{cases} P_F(x, y, t)|_{t=0} = P_{F0}(x, y) \\ P_{mg}(x, y, t)|_{t=0} = P_{mg0}(x, y) \end{cases} \quad (15)$$

where, $P_{F0}(x,y)$—a distribution of the initial gas pressure in the hydraulic fracture, in MPa;
$P_{mg0}(x,y)$—a distribution of the initial gas pressure in the matrix, in MPa;
x, y—horizontal and vertical coordinates respectively in the rectangular coordinate system;

$$\begin{cases} S_{Fw}(x, y, t)|_{t=0} = S_{Fw0}(x, y) \\ S_{mw}(x, y, t)|_{t=0} = S_{mw0}(x, y) \end{cases} \quad (16)$$

where, $S_{Fw0}(x,y)$—a distribution of initial water saturation in the hydraulic fracture, dimensionless;
$S_{mw0}(x,y)$—a distribution of initial water saturation in the matrix, dimensionless;

c) inner boundary conditions are:

$$\begin{cases} P_F(x_w, y_w, t) = P_{wf}(t) \\ P_m(x_w, y_w, t) = P_{wf}(t) \end{cases} \quad (17)$$

where, $x_w$ and $y_w$—horizontal and vertical coordinates of the grid cell where the gas well is located, in m;
$P_{wf}$—a bottom hole pressure, in MPa;

d) outer boundary conditions are:

$$\begin{cases} \frac{\partial P_m}{\partial x}\bigg|_{x=0,L_x} = 0 \\ \frac{\partial P_m}{\partial y}\bigg|_{y=0,L_y} = 0 \end{cases} \quad (18)$$

where, $L_x$, $L_y$—a reservoir length and a reservoir width, respectively, in m;

the productivity model is numerically solved to obtain the gas saturation $S_{Fg}$ in the hydraulic fracture and the gas saturation $S_{mg}$ in the matrix at different times, thereby obtaining the gas saturation $S_{mgi,j,t}$ of each matrix grid cell and the gas saturation $S_{Fgl,t}$ of each hydraulic fracture segment in the target reservoir at time t, so as to calculate the cumulative gas production Q of the gas well produced up to time t by the following equation:

$$Q = \sum_{i=1}^{n_i} \sum_{j=1}^{n_j} (x_{i,j} \cdot y_{i,j} \cdot h) \phi_m (S_{mg\ i,j,0} - S_{mg\ i,j,t}) + \sum_{l=1}^{n_l} (\xi_l \cdot D \cdot h_F) \phi_F (S_{Fg\ l,0} - S_{Fg\ l,t}); \quad (19)$$

where, Q—a cumulative gas production of the gas well from production to time t, in m³;
i, j—Grid coordinates of the matrix;
$n_i$, $n_j$—a total number of grids in x and y directions in the matrix grid;
$n_f$—a number of the hydraulic fracture segments;
$S_{mgi,j,0}$—an initial gas saturation in the grid at positions i and j;
$S_{mgi,j,t}$—a gas saturation in the grid at time t at positions i and j;
$x_{i,j}$, $y_{i,j}$—a length and a width of the grid at positions i and j, in m;
$S_{Fgl,0}$—an initial gas saturation of the l-th hydraulic fracturing segment;
$S_{Fgl,t}$—a gas saturation of the l-th hydraulic fracturing segment at time t;
$\xi_l$—a length of the l-th hydraulic fracture segment, in m;
$h_F$—a height of hydraulic fracture, in m;
h—a reservoir thickness, in m;

if $K_F=K_{FR}$, the cumulative gas production $Q_1$ considering the creep damage is obtained by the above equation; if $K_F=K_{F0}$, the cumulative gas production $Q_2$ without considering the creep damage is obtained by the above equation; the creep damage rate C of the cumulative production is calculated by the following equation:

$$C = \frac{|Q_1 - Q_2|}{Q_2} \times 100\%; \quad (20)$$

when C≤5%, the creep damage is minimal and the target reservoir is not susceptible to the creep damage; when 5%<C≤10%, the target reservoir is sensitive to the creep damage, and the creep damage is effectively avoided by adjusting fracturing technological parameters; when C>10%, the target reservoir is more sensitive to the creep damage;

(5) repeating Steps (3) to (4) and calculating the creep damage rate for cumulative production for the cases of a hydraulic fracture sanding concentration N of 5 kg/m², 7.5 kg/m², 10 kg/m², 12.5 kg/m² and 15 kg/m² respectively; plotting the creep damage chart of cumulative production, the abscissa represents the sanding concentration, and the ordinate represents the creep damage rate for cumulative production; the creep damage prevention method is identified as follows:

if the sanding concentration is 5 kg/m² and C≤5%, an on-site fracturing is performed for the well according to recommended parameters; if the sanding concentration N is 5 kg/m², 5%<C≤10%, or if N is 5 kg/m², C>10% and then ≤10% after N is increased, the creep damage is effectively avoided by adjusting a proppant particle size, a proppant sanding concentration and a flowback regime in the well;

if the creep damage rate C of cumulative production is higher than 10% after the sanding concentration N reaches 15 kg/m², the creep damage is reduced by increasing the sanding concentration in the well.

2. The method for evaluating and preventing a creep damage to a conductivity of a hydraulic fracture in gas reservoirs according to claim 1, wherein in the step (3), the hydraulic fracture width D is calculated by the following formula:

$$D = 1000 \times \frac{N}{\rho};$$

where, D—the hydraulic fracture width, in mm;
N—the sanding concentration of the proppant, in kg/m$^2$;
$\rho$—a bulk density of the proppant, in kg/m$^3$.

\* \* \* \* \*